United States Patent
Esaki et al.

[19]

[11] Patent Number: 5,924,766
[45] Date of Patent: Jul. 20, 1999

[54] TEMPERATURE CONDITIONER FOR VEHICLE SEAT

[75] Inventors: Hidenori Esaki; Tomohide Kudo; Takeshi Shiba, all of Wako, Japan

[73] Assignee: Honda Giken Kogyo Kabushiki Kaisha, Tokyo, Japan

[21] Appl. No.: 09/064,396

[22] Filed: Apr. 22, 1998

[30] Foreign Application Priority Data

Apr. 22, 1997 [JP] Japan .................................. 9-104952

[51] Int. Cl.$^6$ .................................................. A47C 7/72
[52] U.S. Cl. ................ 297/180.13; 454/120; 297/452.47
[58] Field of Search ........................... 297/180.1, 180.12, 297/180.13, 180.14, 452.42, 452.46, 452.47; 454/120

[56] References Cited

U.S. PATENT DOCUMENTS

| | | | |
|---|---|---|---|
| 4,923,248 | 5/1990 | Feher ............................... | 297/180.13 X |
| 4,969,684 | 11/1990 | Zarotti ................................. | 297/180.12 |
| 5,416,935 | 5/1995 | Nieh ................................. | 297/180.13 X |
| 5,626,386 | 5/1997 | Lush .................................... | 297/180.13 |
| 5,833,321 | 11/1998 | Kim et al. .......................... | 297/452.42 |

FOREIGN PATENT DOCUMENTS

| | | | |
|---|---|---|---|
| 411375 | 2/1991 | European Pat. Off. .......... | 297/180.13 |
| 5-277020 | 10/1993 | Japan . | |

Primary Examiner—Milton Nelson, Jr.
Attorney, Agent, or Firm—Merchant, Gould, Smith, Edell, Welter & Schmidt, P.A.

[57] ABSTRACT

A vehicle seat temperature conditioner includes a Peltier element, a heat exchanger for performing a heat exchange between heat generated or absorbed by the Peltier element and air transferred from a blower, and a case housing the Peltier element and heat exchanger together so as to provide the temperature conditioner as an independent self-contained unit or module. The housing case is made of a resilient and flexible material and functions also as a connector for coupling with an air intake pipe to introduce air from a blower into the vehicle seat temperature conditioner and with an air discharge pipe to discharge temperature-conditioned air from the temperature conditioner to air holes formed in the vehicle seat.

3 Claims, 9 Drawing Sheets

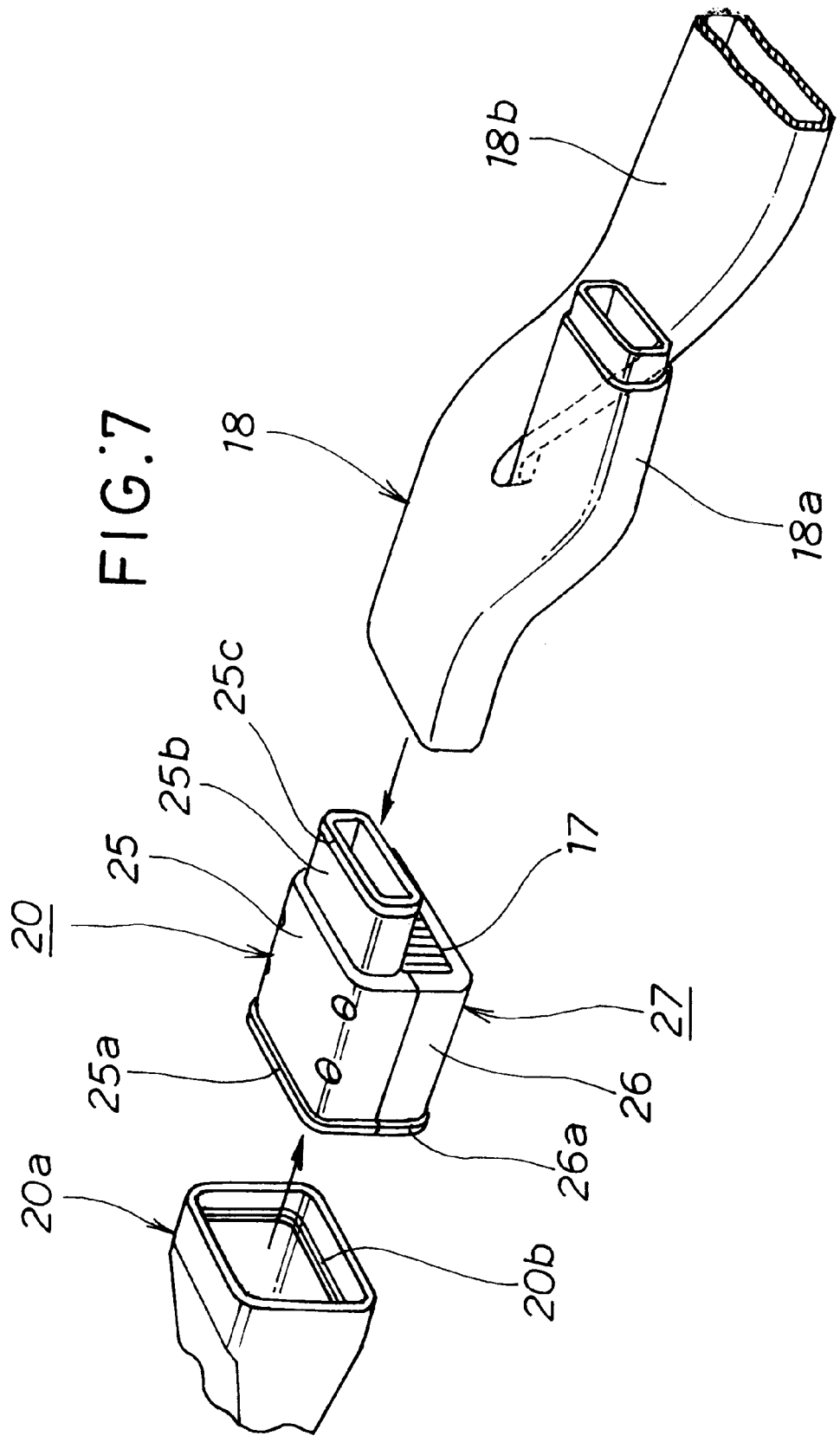

TEMPERATURE CONDITIONER FOR VEHICLE SEAT

BACKGROUND OF THE INVENTION

1. Field of the Invention

The present invention relates to an improvement in temperature conditioners for warming and cooling vehicle seats.

2. Description of the Related Art

Generally, in a hot summer season or high-temperature regions, a comfortable drive is hardly achieved due to perspiration on sitter's body portions contacting the seating section (hereinafter, this term will be used to distinguish from an entire seat structure) and backrest of an automotive vehicle seat. In a cold winter season or low-temperature regions, a comfortable drive is also hard to achieve. Thus, automotive vehicles have been becoming increasingly popular which are provided with a temperature conditioning function to warm or cool their seats, as typically disclosed in Japanese Patent Laid-open Publication No. HEI-5-277020. According to the disclosure, the vehicle seat includes a seating section (on which a sitter's weight rests), a backrest, a first duct disposed within the backrest, a second duct disposed within the seating section, and a Peltier element disposed in a space underneath the seating section and including first and second fins for warming or cooling air.

According to the disclosure in the HEI-5-277020 publication, the underside of the seating section defines the upper boundary of the space, so that the first fin of the Peltier element and other members defining the space must be configured in conformity of the shape of the underside of the seating section. Thus, dedicated component parts are required for fitting the first fin and other space-defining members to the underside of the seating section, resulting in an increase in the cost. Further, because pipes connecting the Peltier element and the first and second ducts are fastened directly to the underside of the seating section, the connecting pipes can not be easily detached and reattached such as when the Peltier element is to be replaced. Moreover, because the entire space underneath the sea ting section is occupied by the first and second fins, it is difficult to put goods in the space and a person sitting behind the seat (e.g., rear-seat passenger) can hardly stretch her or his legs into the space.

SUMMARY OF THE INVENTION

According to an aspect of the present invention, there is provided a vehicle seat temperature conditioner for warming or cooling air inside a vehicle during transfer of the air from a blower to air holes formed in a seat of the vehicle, which comprises a Peltier element, a heat exchanger for performing a heat exchange between heat generated or absorbed by the Peltier element and the air transferred from the blower, and a case housing the Peltier element and heat exchanger together. The case housing the Peltier element and heat exchanger includes connector portions for coupling with an air intake pipe to introduce the air from the blower into the vehicle seat temperature conditioner and with an air discharge pipe to discharge temperature-conditioned air from the vehicle seat temperature conditioner to the air holes in the seat.

Because the temperature conditioner is arranged as an independent self-contained unit or module by housing the Peltier element and heat exchanger together in the case, it can be applied to various vehicle seats. Further, because the case includes connector portions for coupling with the air intake pipe and air discharge pipe, the temperature conditioner can be readily coupled with or decoupled from the air intake and discharge pipes. In addition, the provision of the connector portions eliminates a need for any particular connecting members, thereby permitting effective use of a limited space underneath the vehicle seat.

To facilitate coupling with the air intake and discharge pipes, the housing case is preferably made of a resilient and flexible material. Thus, even where there is only a small space underneath the vehicle seat, the case can be readily attached to the air intake and discharge pipes, taking advantage of its resiliency and flexibility.

BRIEF DESCRIPTION OF THE DRAWINGS

Preferred embodiments of the present invention will be described hereinbelow, by way of example only, with reference to the accompanying drawings, in which:

FIG. 7 is a perspective view showing a manner in which the temperature conditioner is connected with an air intake pipe and intermediate duct;

DETAILED DESCRIPTION OF THE PREFERRED EMBODIMENTS

The following description is merely exemplary in nature and is in no way intended to limit the invention or its application or uses.

Figure 1:
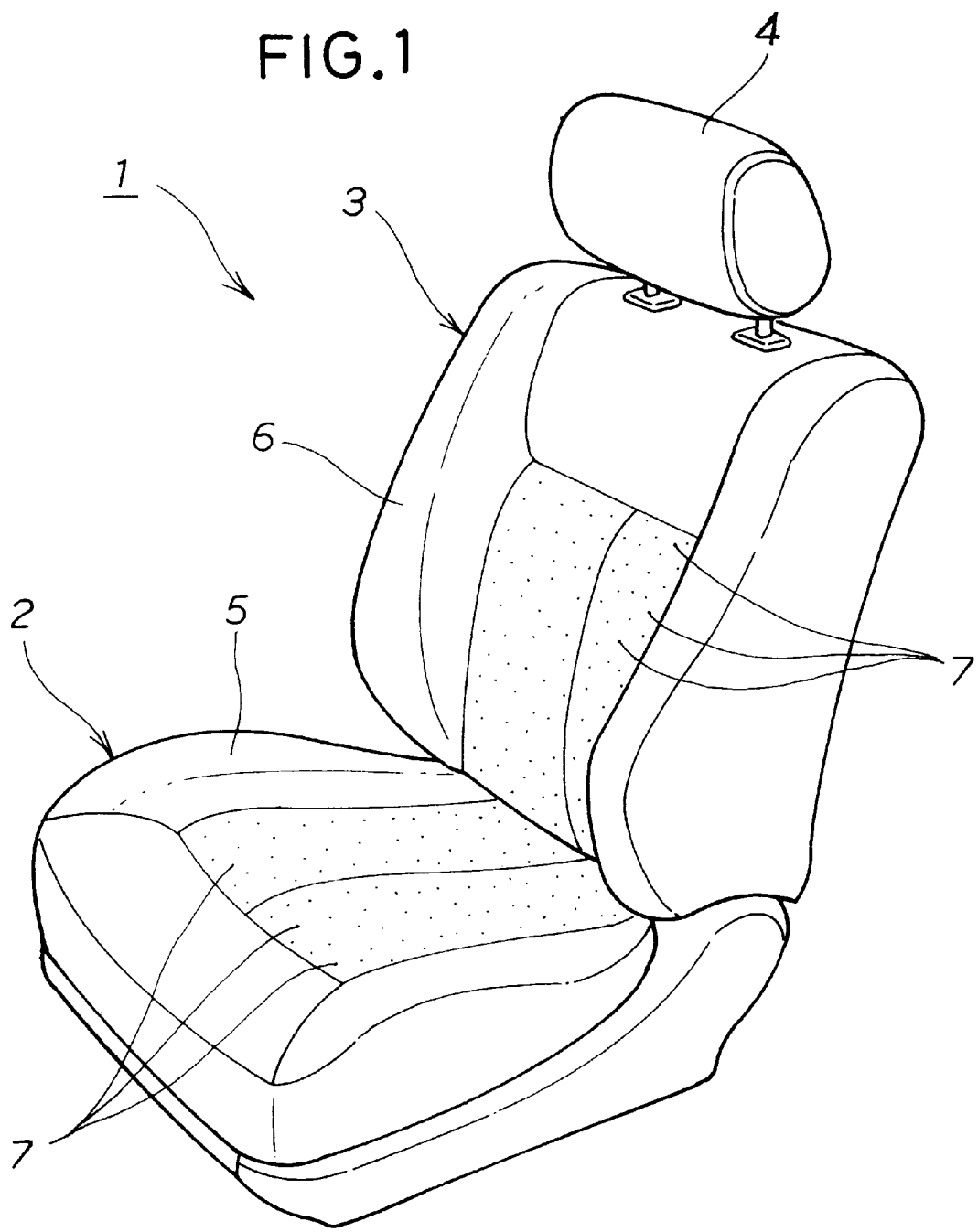
FIG. 1 is a perspective view of an automotive vehicle seat to which is applied a temperature conditioner in accordance with a preferred embodiment of the present invention.

FIG. 1 is a perspective view of an automotive vehicle seat to which is applied a temperature conditioner in accordance with a preferred embodiment of the present invention, which includes a cushioned seating section 2, a backrest 3 and a headrest 4 attached to the top of the backrest 3. The seating section 2 and backrest 3 have a multiplicity of small air holes 7 formed in their respective outer covers 5 and 6.

Figure 2:
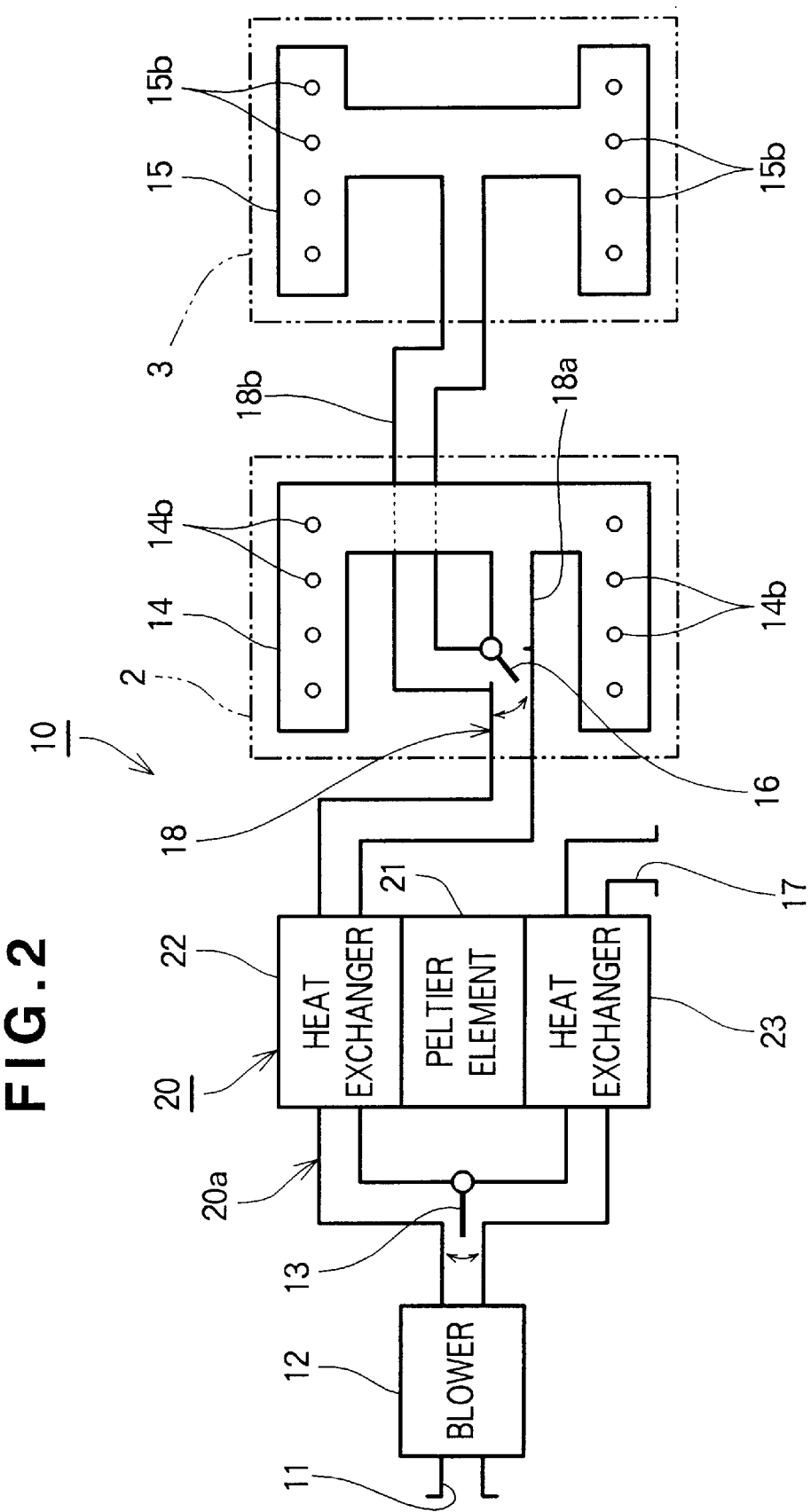
FIG. 2 is a block diagram showing a temperature-conditioned-air supply device employing the temperature conditioner according to the preferred embodiment.

FIG. 2 is a block diagram showing a temperature-conditioned-air supply device 10 employing the temperature conditioner according to the preferred embodiment. The temperature-conditioned-air supply device 10 conditions the temperature of air and feeds the temperature-conditioned air to the seating section 2 and backrest 3. To this end, the temperature-conditioned-air supply device 10 includes a blower 12 for forcing in a downstream direction air introduced from the inside of the vehicle through an air inlet port 11, a first damper 13 for switching the direction of the air flow from the blower 12, and a temperature conditioner 20 disposed downstream of the first damper 13 for controlling or conditioning the temperature of the seat. The temperature-conditioned-air supply device 10 further includes a first air duct 14 for discharging the temperature-conditioned air from the temperature conditioner 20 through a lower portion of the seating section 2, a second air duct 15 for discharging the temperature-conditioned air through a rear portion of the backrest 3, and a second damper 16 for switchably directing the flow of the temperature-conditioned air to the first or second air duct 14 or 15. Reference numeral 17 represents an air outlet port.

As further shown in FIG. 2, the temperature conditioner 20 includes a Peltier element 21 for generating or absorbing heat on the basis of the Peltier effect upon energization thereof, and heat exchangers 22 and 23 for permitting a heat transfer or exchange between the Peltier element 21 and the air sent via the blower 12. More specifically, the Peltier element 21 is composed of at least two different conductors and generates or absorbs heat, other than Joule heat, at the junction of the conductors when current is passed through the junction. Where the Peltier element 21 is composed of two junctions, it can operate in such a manner that the one of the junctions generates heat and the other junction absorbs as much heat as the generated heat.

Figure 3:
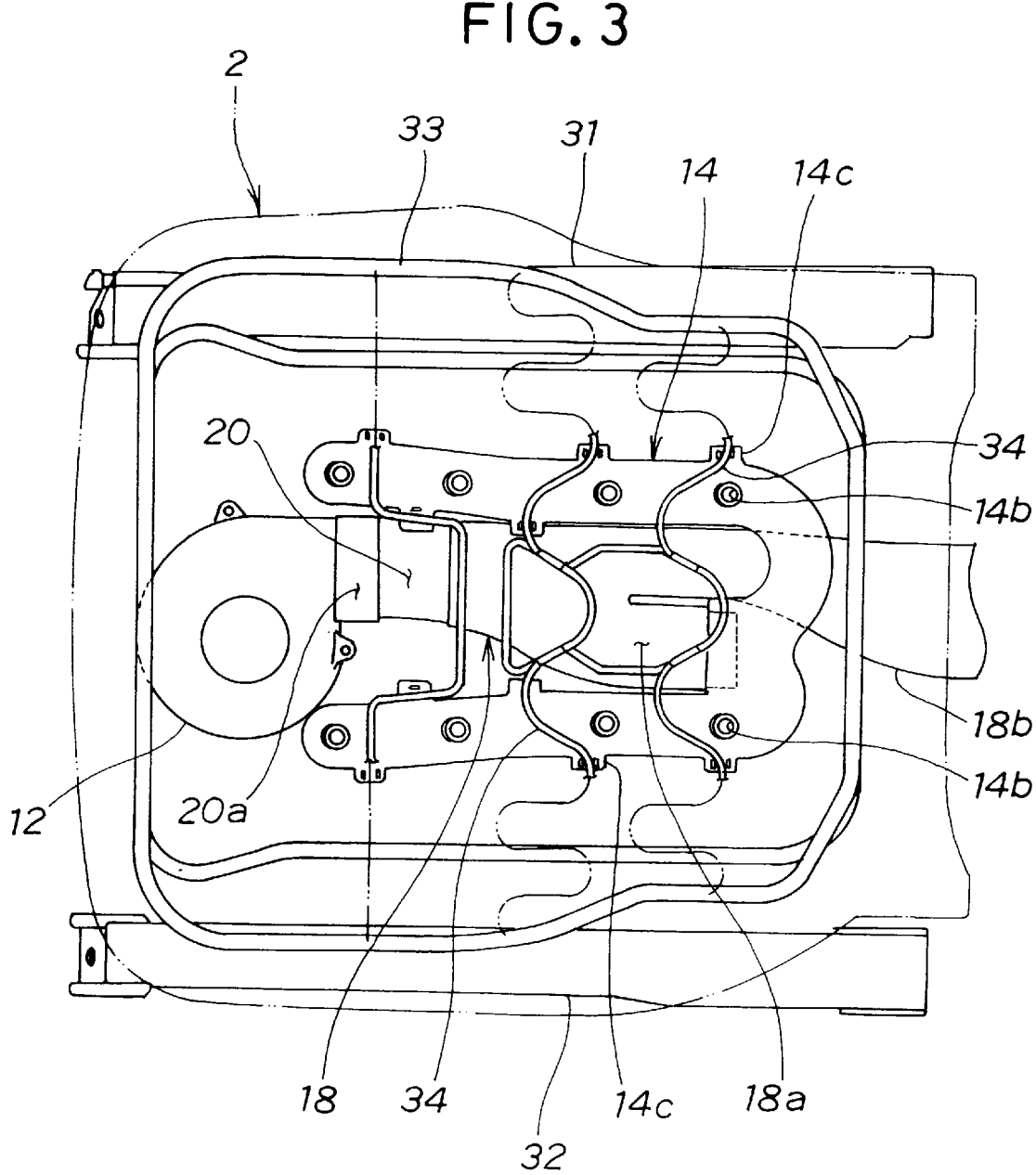
FIG. 3 is a schematic plan view showing details of the temperature-conditioned-air supply device attached to the underside of a seating section of the vehicle seat.

FIG. 3 is a schematic plan view of the seating section 2 with its outer cover and parts removed, showing details of the temperature-conditioned-air supply device attached to the underside of the seating section 2. As shown, the seating section 2 includes a pair of seat rails 31 and 32, a seat frame 33 mounted on the seat rails 31 and 32, and a plurality of seat springs 34 secured to the seat frame 33.

The blower 12 of the temperature-conditioned-air supply device 10 (FIG. 2) is disposed underneath a front portion of the seating section 2, and the temperature conditioner 20 is connected with a rear portion of the blower 12 via an air intake pipe 20a. The first air duct 14, which is generally U-shaped as viewed in plan, includes a plurality of air discharge holes 14b and a plurality of ear portions 14c each for securing the corresponding seat spring 34 such as by wire. The first air duct 14 is connected to the temperature conditioner 20 by means of an intermediate air duct 18 functioning as a flexible discharge pipe. The intermediate air duct 18 is branched into a first pipe portion 18a connecting to the first air duct 14 and a second pipe portion 18b connecting to the second air duct 15 (FIG. 2).

Figure 4:
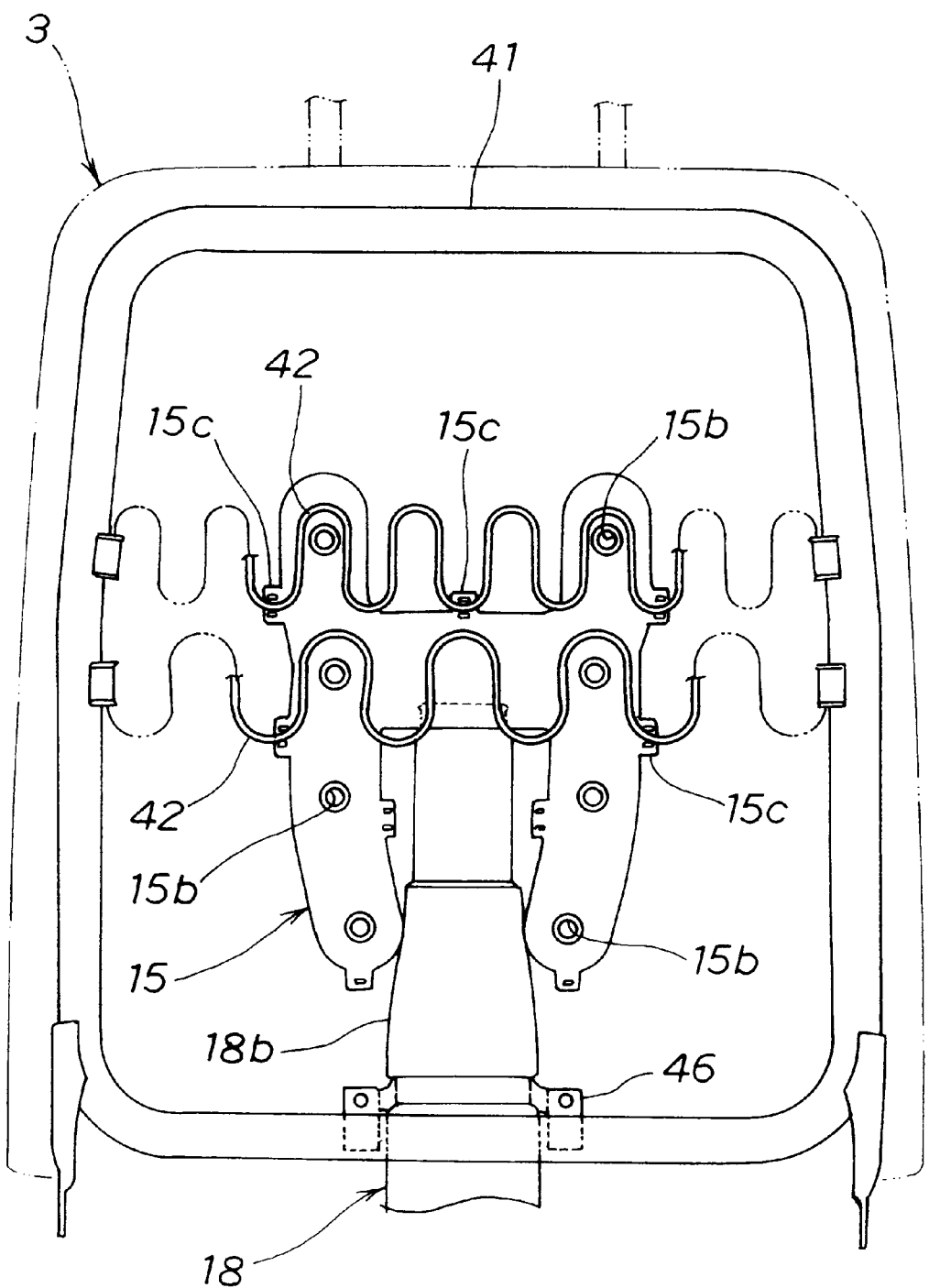
FIG. 4 is a schematic front view showing details of an air duct attached to a backrest of the vehicle seat.

FIG. 4 is a schematic front view of the backrest 3 with its outer cover and parts removed, showing details of the second air duct 15 attached to the backrest 3. The backrest 3 includes a subsidiary seat frame 41 and a plurality of seat springs 42 secured to the subsidiary seat frame 41. The second air duct 15, which is generally H-shaped, includes a plurality of air discharge holes 15b and a plurality of ear portions 15c each for securing the corresponding seat spring 42 such as by wire. The second air duct 15 is coupled with the second pipe portion 18b of the intermediate air duct 18. Reference numeral 46 represents a member for fastening the intermediate air duct 18 to the subsidiary seat frame 41.

Figure 5:
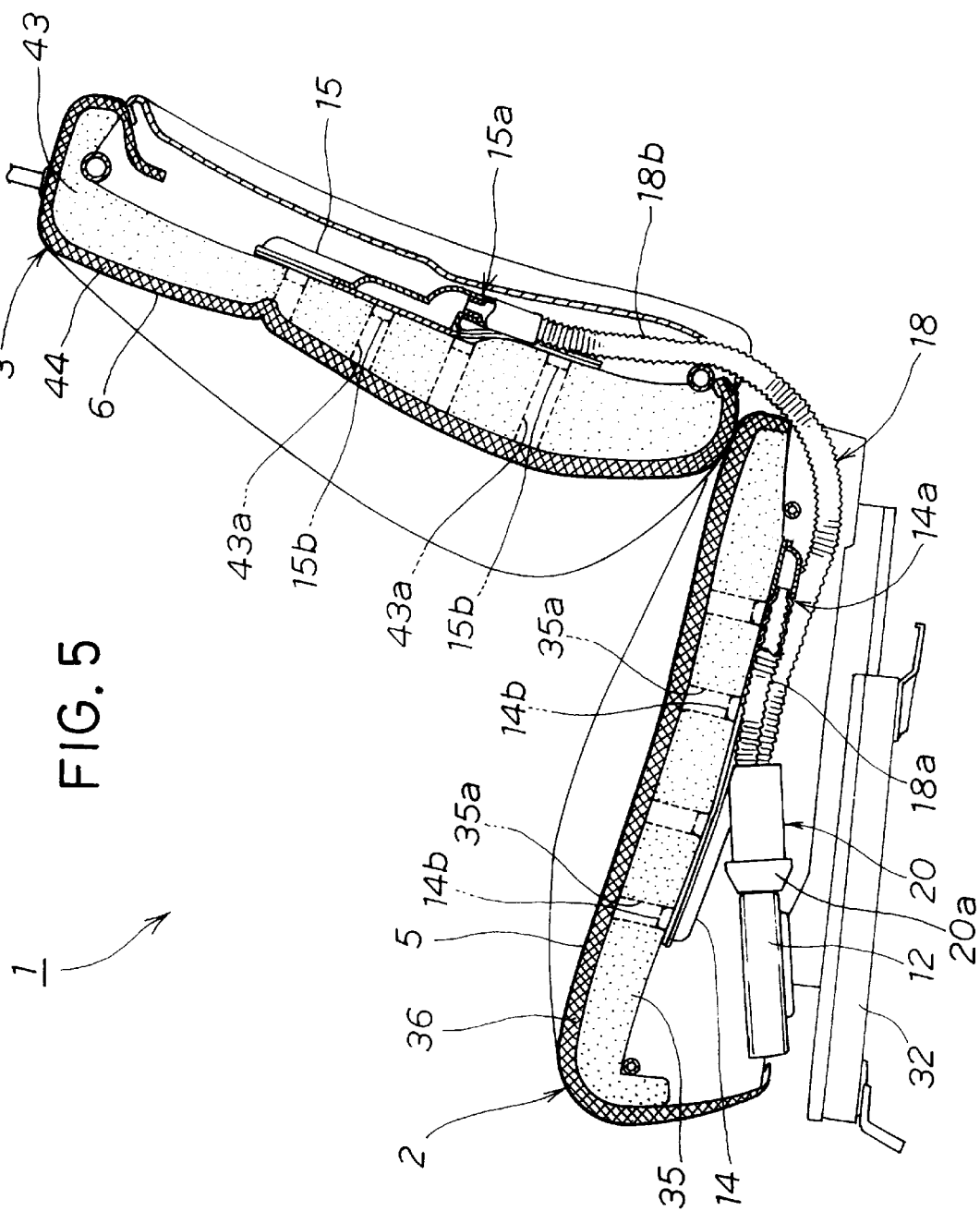
FIG. 5 is a sectional side view of the vehicle seat employing the temperature conditioner according to the preferred embodiment.

FIG. 5 is a sectional side view of the vehicle seat 1 employing the temperature conditioner 20 according to the preferred embodiment. The seating section 2 includes a cushion pad 35, an air-permeable cover pad 36 surrounding the cushion pad 35, and the outer cover 5 enclosing the cover pad 36. The cushion pad 35, which is preferably made of urethane foam, has a plurality of vent holes 35a communicating with the air discharge holes 14b of the first air duct 14 and is attached to the seat springs 34 (FIG. 3). Similarly to the seating section 2, the backrest 3 includes a cushion pad 43 attached to the seat springs 42 (FIG. 4), an air-permeable cover pad 44 surrounding the cushion pad 43, and the outer cover 6 enclosing the cover pad 44. The cushion pad 43, which is preferably made of urethane foam, has a plurality of vent holes 43a communicating with the air discharge holes 15b of the second air duct 15.

In the seating section 2, the air, having passed through the vent holes 35a, is directed through the cover pad 36 and is let out through the air holes 7 in the outer cover 5 shown in FIG. 1. Thus, the hips, thighs and legs of the sitter can be warmed or cooled by the air let out through the air holes 7. Similarly, in the backrest 3, the air, having passed through the vent holes 43a, is directed through the cover pad 44 and is let out through the air holes 7 in the outer cover 6 shown in FIG. 1. Thus, the loins and back of the sitter can be warmed or cooled by the air let out through the air holes 7.

Figure 6:
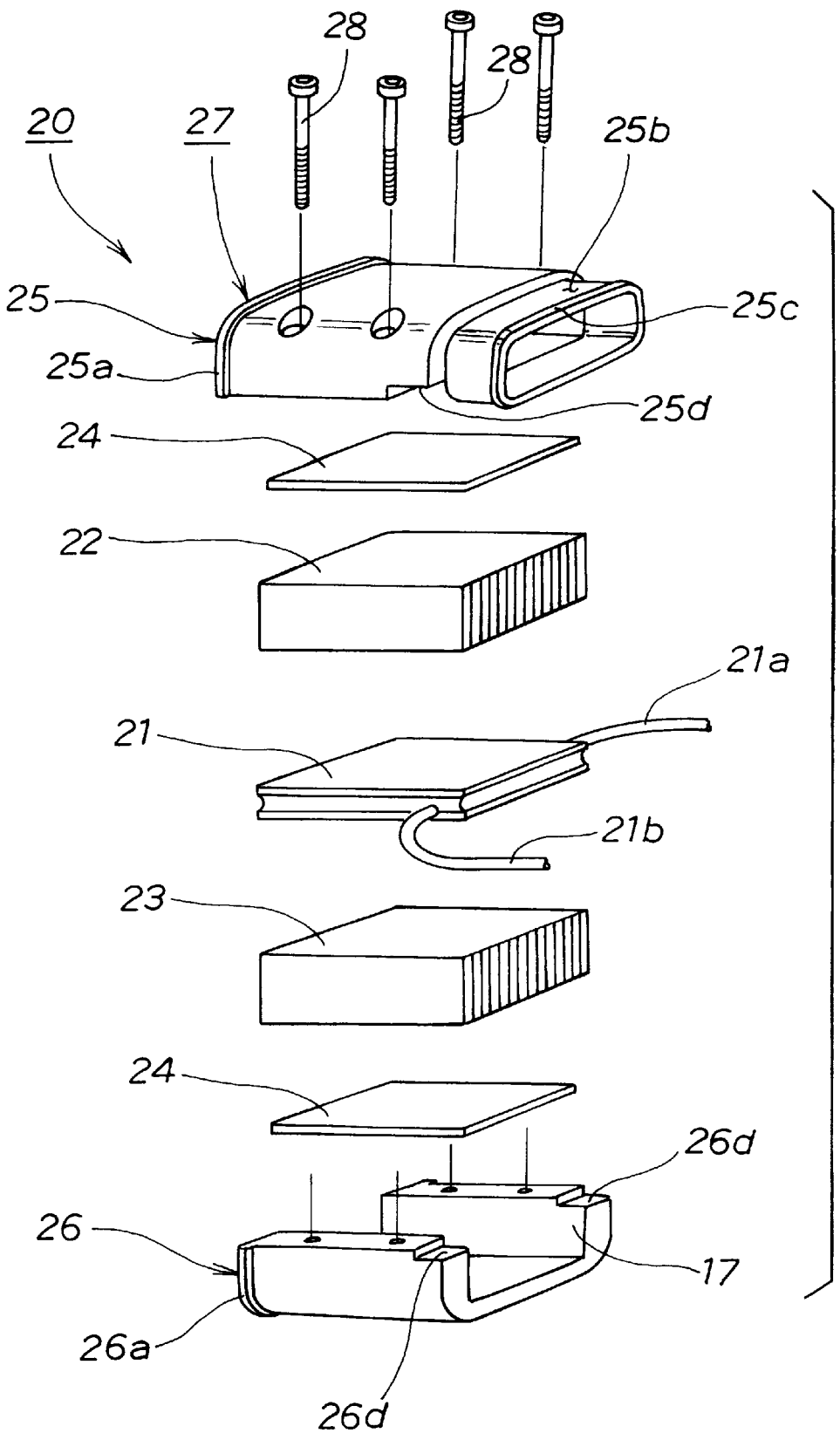
FIG. 6 is an exploded perspective view of the temperature conditioner according to the preferred embodiment.

FIG. 6 is an exploded perspective view of the temperature conditioner 20 according to the preferred embodiment. As shown, the Peltier element 21 is positioned centrally in the temperature conditioner 20, and the heat exchangers 22 and 23 are disposed above and below the Peltier element 21, respectively. The mechanism 20 also includes a housing case 27 which has a pair of upper and lower case members 25 and 26 vertically sandwiching therebetween the heat exchangers 22 and 23 via heat insulating members 24, so as to house the Peltier element 21 and heat exchangers 22 and 23 together. The upper and lower case members 25 and 26 are joined together by means of bolts 28, and the Peltier element 21 is connected to a power supply (not shown) via leads 21a and 21b.

The upper case member 25 has an air inlet opening at its one end (left end in the figure) and an air outlet opening at the opposite end (right end in the figure). Air is introduced via the air inlet into the heat exchanger 22 and then discharged from the heat exchanger 22 to the air outlet opening. At the one end, the upper case member 25 has a connector portion in the form of an outer peripheral ridge 25a for coupling with the air intake pipe 20a of FIG. 2. The other end of the upper case member 25 is formed into a cylindrical connector portion 25b for coupling with the intermediate duct 18 (FIG. 2); to this end, the connector portion 25b has an outer peripheral ridge 25c at its distal end. Two recessed portions 25d (only one shown in FIG. 6) are formed in the upper case member 25 for passage therethrough of the upper portions of the leads 21a and 21b of the Peltier element 21.

The lower case member 26 has an air inlet opening at its one end (left end in the figure) and an air outlet opening at the opposite end (right end in the figure). Air is introduced via the air inlet opening into the heat exchanger 23 and then discharged from the heat exchanger 23 to the air outlet opening. At the one end, the lower case member 26 has a connector portion in the form of an outer peripheral ridge 26a for coupling with the air intake pipe 20a of FIG. 2. At the other end, the lower case member 25 has the air outlet port 17 shown in FIG. 2. Two recessed portions 26d are formed in the lower case member 26 for passage therethrough of the lower portions of the leads 21a and 21b of the Peltier element 21.

Because the temperature conditioner 20 is arranged as an independent self-contained unit or module by housing the Peltier element 21 and heat exchangers 22 and 23 together in the case 27 as mentioned above, it can be applied to various vehicle seats and other equipment than vehicle seats. Further, the position of the temperature conditioner unit 20 mounted underneath the seat assembly 1 can be changed freely as desired by the user. For example, by placing the temperature conditioner unit 20 toward one particular side of the seat assembly 1, a sufficient space can be provided under the seating section 2 for storing goods or for allowing a rearseat passenger to stretch his or her legs. Furthermore, if a plurality of such temperature conditioner units 20 are assembled in advance, they can be sequentially attached to the seats 1 being output in a production line, which would greatly increase productivity.

FIG. 7 is a perspective view showing a manner in which the temperature conditioner 20 is connected with the air intake pipe 20a and intermediate duct 18. The ridges 25a and 26a formed on the case 27 of the temperature conditioner 20 are fitted into a groove 20b formed in the inner surface of the air intake pipe 20a, and the ridge 25c formed on the connector portion 25b of the case 27 is fitted into a groove (not shown) formed in the inner surface of the intermediate duct 18. These simple fitting engagements achieve reliable coupling between the temperature conditioner 20 and the the air intake pipe 20a and intermediate duct 18.

Preferably, the above-mentioned case 27 is made of a resilient and flexible material such as soft resin or rubber. The resiliency and flexibility of the case 27 greatly facilitate coupling and decoupling between the case 27 and the air intake pipe 20a and intermediate duct 18; for example, when the temperature conditioner 20 is to be replaced with another one, it can be readily detached from and reattached to the air intake pipe 20a and intermediate duct 18.

Further, even where there is only a small space underneath the seat 1 (see FIG. 5), the case 27 can be readily attached to the intermediate duct 18 such as by flexing the connector portion 25b in a given direction. Thus, the limited space can be utilized with increased efficiency. Furthermore, the resiliency of the case 27 provides effectively-sealed fitting engagements between the ridges 25a, 26a, 25c and the grooves of the air intake pipe 20a and intermediate duct 18. Moreover, even where the temperature conditioner 20 is attached directly to the underside of the seating section 2, the resiliency of the case 27 would not reduce the cushioning capability of the seat 1.

Now, a description will be given about behavior of the temperature-conditioned-air supply device 10 with reference to FIGS. 8A to 8D.

Figure 8A:
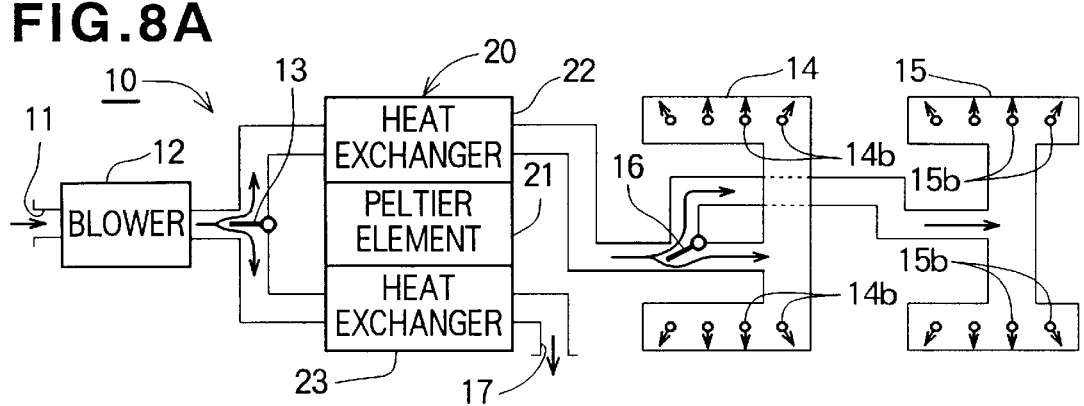
FIGS. 8A to 8D are diagrams showing behavior of the temperature-conditioned-air supply device.
Figure 8B:
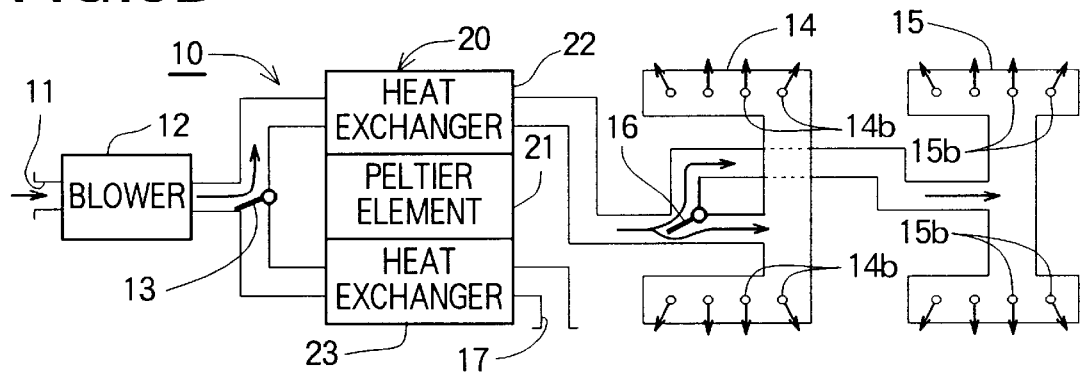

FIG. 8A is a diagram showing an operating state of the temperature-conditioned-air supply device 10 where the first and second dampers 13 and 16 are both held in a neutral position, and FIG. 8B is a diagram showing another operating state of the supply device 10 where the first damper 13 is tilted to one side so as to send air to both of the first and second air ducts 14 and 15. Further, FIG. 8C is a diagram showing still another operating state of the supply device 10 where the first damper 13 is tilted to the one side and the second damper 16 is tilted to one side so as to send air only to the first air duct 14, and FIG. 8D is a diagram showing still another operating state of the supply device 10 where the first damper 13 is tilted to the one side and the second damper 16 is tilted to the other side so as to send air only to the second air duct 15.

Upon activation of the blower 12 in the operating state of FIG. 8A, air inside the vehicle is introduced via the air inlet port 11 into the supply device 10, where it is branched into two air flows by the first damper 13 disposed downstream of the blower 12. One of the air flows having passed by the first damper 13 is directed to the heat exchanger 22 of the temperature conditioner 20. The Peltier element 21 is energized to generate (or absorb) heat, and the heat exchanger 22 effects a heat transfer or exchange between the Peltier element 21 and the air flow. The heat transfer warms or (cools) the air, and the resultant warm or cool air is then branched into two warm (or cool) air flows by the second damper 16 disposed downstream of the temperature conditioner 20. One of the warm (or cool) air flows is discharged via the air discharge holes 14b of the first air duct 14 attached to the seating section 2, and the other warm (or cool) air flow is discharged via the air discharge holes 15b of the second air duct 15 attached to the backrest 3. The other air flow having passed by the first damper 13 is directed to the heat exchanger 23, where a heat transfer is effected between the Peltier element 21 and the air flow for an exchange of heat equal in amount to the heat generated (or absorbed) by the Peltier element 21. The heat exchange cools (or warms) the air, and the resultant cool (or warm) air is then discharged inside or outside the vehicle via the air outlet port 17.

Upon activation of the blower 12 in the operating state of FIG. 8B, air inside the vehicle is introduced via the air inlet port 11 into the supply device 10, where it is directed by the first damper 13 only to the heat exchanger 22 of the temperature conditioner 20. The heat exchanger 22 effects a heat transfer between the Peltier element 21 and the introduced air to warm or (cool) the air, and the resultant warm or cool air is then branched into two warm (or cool) air flows by the second damper 16. One of the warm (or cool) air flows is discharged via the air discharge holes 14b of the first air duct 14 attached to the seating section 2, and the other warm (or cool) air flow is discharged via the air discharge holes 15b of the second air duct 15 attached to the backrest 3. In this operating state, the amount of air from the air discharge holes 14b and 15b is greater than that of FIG. 8A by the amount not discharged via the outlet port 17.

Figure 8C:
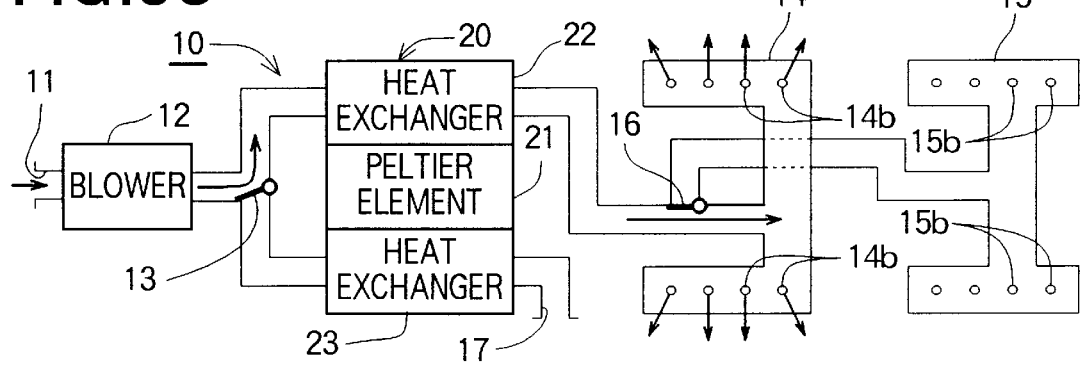
Figure 8D:
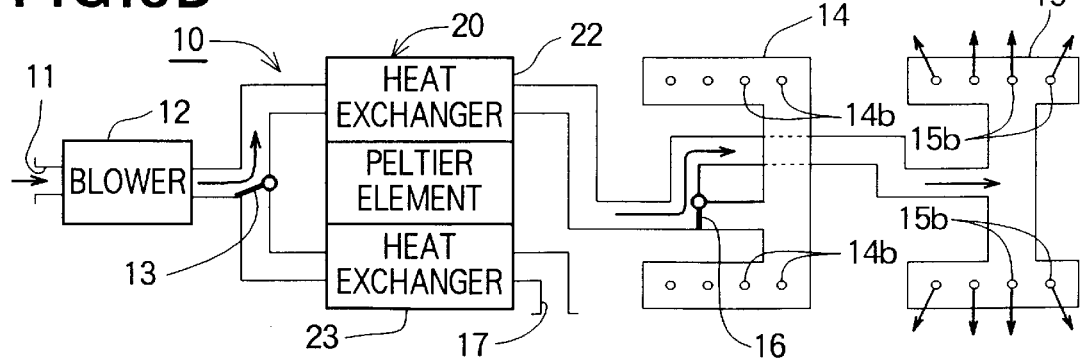

Upon activation of the blower 12 in the operating state of FIG. 8C, air inside the vehicle is introduced via the air inlet port 11 into the supply device 10, where it is directed by the first damper 13 only to the heat exchanger 22 of the temperature conditioner 20. The heat exchanger 22 effects a heat transfer between the Peltier element 21 and the introduced air to warm or (cool) the air, and the resultant warm or cool air is then sent by the second damper 16 only to the first air duct 14 attached to the seating section 2 and discharged via the air discharge holes 14b. In this operating state, the amount of air from the air discharge holes 14b is greater than that of FIG. 8B by the amount not discharged via the air discharge holes 15b of the second air duct 15.

Further, upon activation of the blower 12 in the operating state of FIG. 8D, air inside the vehicle is introduced via the air inlet port 11 into the supply device 10, where it is directed by the first damper 13 only to the heat exchanger 22 of the temperature conditioner 20. The heat exchanger 22 effects a heat transfer between the Peltier element 21 and the introduced air to warm or (cool) the air, and the resultant warm or cool air is then sent by the second damper 16 only to the second air duct 15 attached to the backrest 3 and discharged via the air discharge holes 15b. In this operating state, the amount of air from the air discharge holes 15b is greater than that of FIG. 8B by the amount not discharged via the air discharge holes 14b of the first air duct 14.

Figure 9:
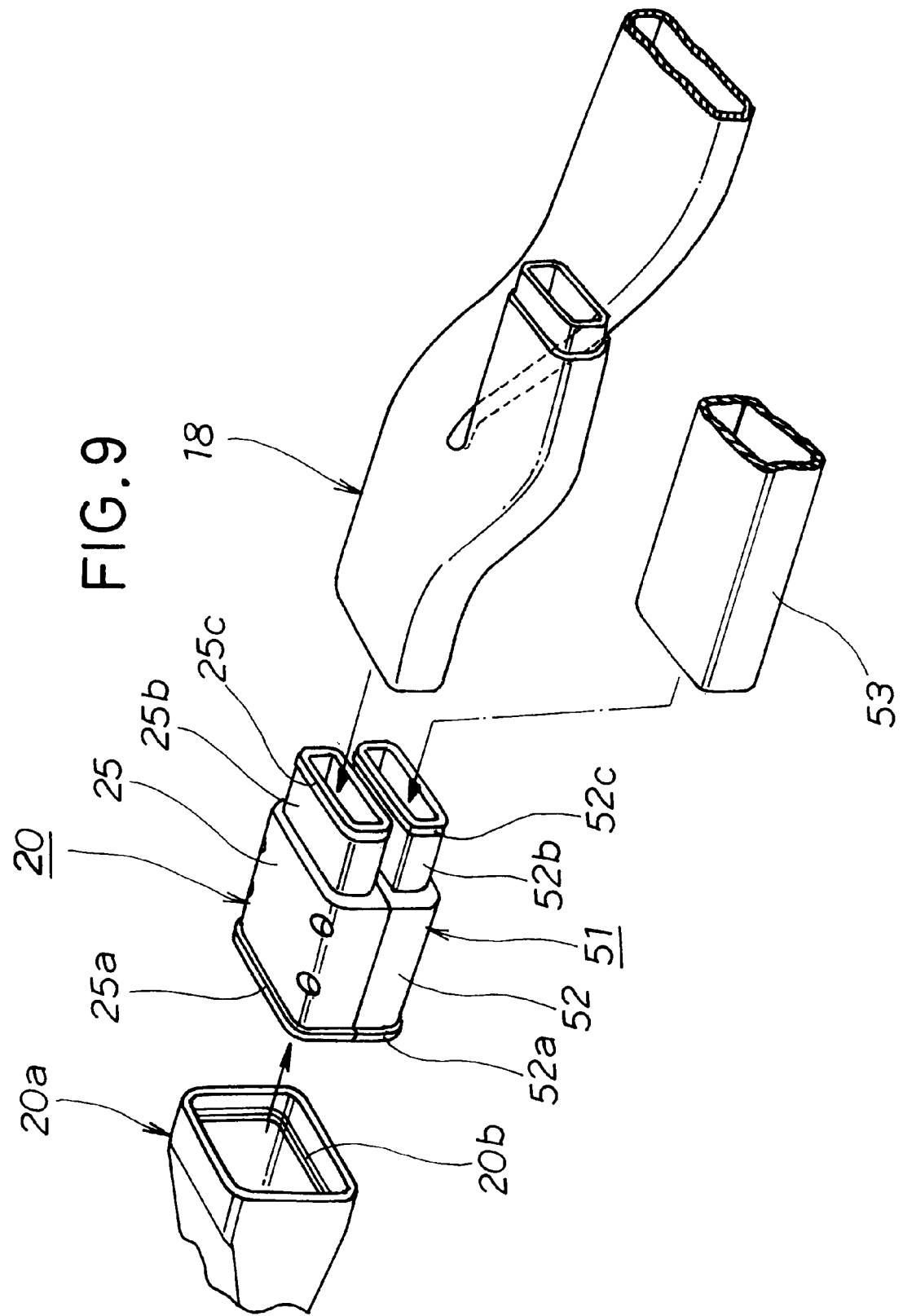
FIG. 9 is a perspective view of a modified case of the temperature conditioner.

FIG. 9 is a perspective view showing a modified housing case of the temperature conditioner 20, where same elements as in FIG. 7 are denoted by same reference numerals in the figure and will not be described in detail to avoid unnecessary duplication. In FIG. 9, the modified housing case 51 includes upper and lower case members 25 and 52. The lower case member 52 has an outer peripheral ridge 52a at its one end defining an air inlet opening and a connector portion 52b at the other end defining an air outlet opening, and an outer peripheral ridge 52c is formed at the tip of the connector portion 52b. To couple the case 51 with the air intake pipe 20a, the ridges 25a and 52a formed on the case 51 are fitted into the groove 20b formed in the inner surface of the intake pipe 20a. To couple the case 51 with the intermediate duct 18, the ridge 25c formed on the connector portion 25b of the upper case member 25 is fitted into the groove (not shown) formed in the inner surface of the intermediate duct 18. Further, to couple the lower case member 52 with an air discharge duct 53 provided for discharging air outside the vehicle, the outer peripheral ridge 52c formed on the connector portion 52b of the lower case member 52 is fitted into a groove (not visible in the figure) formed in the inner surface of the discharge duct 53. The lower case member 52 too is preferably made of a resilient and flexible material such as soft resin or rubber.

The housing cases 27 and 51 have been described above as having ridges 25a, 26a, 25c and 25a, 52a, 25c, 52c on the outer surface thereof, and the air intake pipe 20a, intermediate duct 18 and air discharge duct 53 have been described as having grooves in the inner surface thereof. Alternatively, the housing cases 27 and 51 may have grooves in the outer surface thereof, and the air intake pipe 20a, intermediate duct 18 and air discharge duct 53 may have ridges for fitting into the grooves.

What is claimed is:

1. A vehicle seat temperature conditioner for warming or cooling air inside a vehicle during transfer of the air from a blower to air holes formed in a seat of the vehicle, said vehicle seat temperature conditioner comprising:

a Peltier element;

a heat exchanger for performing a heat exchange between heat generated or absorbed by said Peltier element and the air transferred from the blower; and a case housing said Peltier element and heat exchanger together, wherein said case housing said Peltier element and heat exchanger includes connector portions for coupling with an air intake pipe to introduce the air from the blower into said vehicle seat temperature conditioner and with an air discharge pipe to discharge the air from said vehicle seat temperature conditioner to the air holes in the seat.

2. A vehicle seat temperature conditioner as recited in claim 1 wherein said case is made of a resilient and flexible material.

3. A vehicle seat temperature conditioner as recited in claim 1 wherein two said heat exchangers are disposed above and below said Peltier element, and said case includes a pair of upper and lower case members housing said Peltier element and heat exchangers together by sandwiching said heat exchangers.

* * * * *

UNITED STATES PATENT AND TRADEMARK OFFICE
Certificate

Patent No. 5,924,766                                                                   Patented: July 20, 1999

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hidenori Esaki, Wako, Japan; Tomohide Kudo, Wako, Japan; and Takeshi Shiba, Wako, Japan.

Signed and Sealed this Third Day of August 2004.

PETER M. CUOMO
*Supervisory Patent Examiner*
*Art Unit 3636*